3,563,766
FLUID SHORTENING COMPOSITION
Nobuya Matsui, Tokyo, Tsutomu Tomita, Chiba, and Tsukasa Kawada, Tokyo, Japan, assignors to Kao Soap Company, Ltd., Tokyo, Japan, a corporation of Japan
No Drawing. Filed Nov. 28, 1966, Ser. No. 597,231
Int. Cl. A23d 5/00
U.S. Cl. 99—118      5 Claims

ABSTRACT OF THE DISCLOSURE

A fluid shortening composition comprises vegetable liquid triglycerides, solid triglycerides, emulsifiers and from 0.1–2% by weight of lecithin as a fluidity increasing agent whereby the composition remains fluid at temperatures of 5° C. and lower.

---

This invention relates to a shortening composition which remains fluid at low temperatures.

Generally a shortening is prepared by mixing a liquid glyceride and a solid fat, composed primarily of a solid glyceride, to produce a plastic fat. This composition is semisolid at the temperatures at which batter can be emulsified and at that temperature it is adapted for making of good quality cakes. Recently, however, cake-making processes have required that the shortening be freely flowable even at a temperature below room temperature. This fluidity is needed for ease of handling of the shortening, for example, during transportation and measurement thereof.

A liquid vegetable oil has the advantage of being a liquid at the desired temperatures, but it is not easily dispersed, its air-holding ability is insufficient, the volume ratio of the cake made from it is smaller than desired, the structure of the cake is not good and, therefore, it lacks the needed properties of a shortening for making baked goods, particularly cakes.

Numerous processes for producing so-called liquid shortenings have been disclosed and some of such liquid shortenings have already been marketed.

We have discovered that, although plastic shortenings may be used for making poundcakes containing a high ratio of oils and fats, it is not adapted at all for making cakes containing a low ratio of oils and fats, such as sponge butter cakes. Sponge butter cakes of good quality can be obtained if a shortening having a high liquid oil content is used.

The shortening composition according to the present invention has a fluidity which makes it easy to handle even at a cold temperature, such as 5° C., and it has favorable baking properties and is well adapted for use in any cake-making process. The shortening composition according to the present invention consists essentially of the following formula (all percentages are by weight):

| | Percent |
|---|---|
| Vegetable liquid triglycerides | 80–90 |
| Solid triglycerides | 0.5–4 |
| Glyceryl mono- and/or di-fatty acid esters | 0–3 |
| Propylene glycol mono- and/or di-fatty acid esters | 8–16 |
| Lecithin | 0.1–2 |
| Polyoxyethylene sorbitan fatty acid ester | 0–5 |
| Cane sugar fatty acid ester | 0–5 |
| Glyceryl lactic mono- and/or di-fatty acid esters | 0–5 |

The liquid triglyceride may be soybean oil, cottonseed oil, rapeseed oil, corn oil, kapok oil or a mixture of any of these, providing they are properly refined so as to be edible. If the amount of liquid triglycerides in the present composition is not at least 80% by weight, either the amount of the solid fats and oils used will be too great to make the shortening composition satisfactory for use at low temperatures or else the amount of the fatty acid polyhydric alcohol ester ingredient used will be larger than is necessary and the butter-like qualities of the shortening will be detrimentally affected.

The solid triglyceride is a hardened oil made by highly hydrogenating soybean oil, cottonseed oil, rapeseed oil, corn oil or an animal oil or fat, and its melting point is in the range of 40 to 65° C.

The acids to be used in forming glyceryl mono- with di-fatty acid esters, polyoxyethylene sorbitan fatty acid esters, cane sugar fatty acid esters, glyceryl lactic mono- and di-fatty acid esters include saturated and unsaturated acids having 14 to 22 carbon atoms. Suitable fatty acids for making the esters include tetradecanoic acid, hexadecanoic acid, octadecanoic acid, eicosanoic acid, docosanoic acid, oleic acid, elaidic acid, linoleic acid, eleostearic acid, linolenic acid, and arachidonic acid. In the production of the esters, either a pure fatty acid or a mixed fatty acid may be used. Its selection and formation are determined by the type of liquid oil to be used.

The lecithin should be of the quality suitable for use in foods. Lecithin has been previously used both as an emulsifying agent and as an antioxidant for shortenings. In the composition of the present invention, its antioxidant property is considered secondary whereas its primary purpose is to act as an ingredient which promotes the fluidity of the shortening.

The effect of 0.3 part by weight on lecithin of the fluidity of the following mixture is indicated in Table I (all parts are by weight).

| | Parts |
|---|---|
| Refined liquid oil | 86.7 |
| Hardened oil (β-type) | 2 |
| Glyceryl mono-fatty acid ester | 1 |
| Propylene glycol mono-fatty acid ester | 10 |
| Lecithin (when used) | 0.3 |

TABLE I

| Measuring temperature (in ° C.) | Mixture containing | |
|---|---|---|
| | 0.3 parts lecithin [1] | No lecithin [1] |
| 30 | o | o |
| 20 | o | o |
| 15 | o | o |
| 10 | o | Δ |
| 5 | o | X |

[1] o = Freely fluid; Δ = Highly viscous fluid; X = Not fluid.

In the above composition, all or any part of the above-mentioned glyceryl mono- and/or di-fatty acid esters can be replaced by a sorbitan mono- and/or di-fatty acid esters.

In preparing the composition of the present invention, all of the solid glycerides and a part of the emulsifying ingredients are added to part of the liquid triglycerides so as to make a stabilized suspension. A mixture prepared by dissolving the remainder of said emulsifying ingredients in the remainder of said liquid triglycerides is cooled and is mixed with the above suspension while it is stirred sufficiently at a proper temperature below 35° C. The shortening thus obtained shows free fluidity even at 5° C.

When the shortening composition of the present invention is used, it is possible to prepare a dough for cakes having a high specific volume using a power mixer. On the other hand, if a conventional plastic oil or fat-type shortening is used in such a mixer, only cakes of inferior quality will be obtained. For example, in tests with white batter cakes, the specific volume of the cake was 3.07 in the former and 2.40 in the latter. Thus, the effect of the present invention is evident.

The following are examples of shortening compositions prepared according to the present invention and used in the tests whose results are tabulated in Table II. All parts are by weight.

mixer for three minutes. Then the wheat flour, which was previously mixed with the baking powder, was added thereto and was lightly mixed. Lastly, water was added to the mixture to prepare a dough. The dough was baked at 180° C. immediately after being prepared to produce sponge butter cakes.

A commercial liquid shortening and a plastic shortening were also tested for comparison with the above three shortening compositions according to the present invention described above. In addition, the plastic type shortening was tested using the conventional method of preparing the dough using that type of shortening.

TABLE II

|  | Shortening of the present invention | | | Commercial liquid shortening | Commercial plastic shortening | |
| --- | --- | --- | --- | --- | --- | --- |
|  | I | II | III |  |  | Conventional method of preparing the dough |
| Fluidity of the shortening at 5° C.[1] | o | o | o | X | Δ |  |
| Properties of sponge butter cakes: | | | | | | |
| 1. Specific volume [2] | 3.80 | 3.55 | 3.60 | 3.40 | 2.40 | 3.20. |
| 2. Inner phase | Good | Good | Good | Good | Poor | Poor. |
| 3. Ageing | Slow | Slow | Slow | Rather fast | Fast | Fast. |
| 4. Flavor | Very good | Good | Good | Good | Poor | Poor. |
| 5. Palatability | Good | do | do | Rather food | do | Rather poor. |

[1] See footnote at end of Table I.
[2] Specific Volume:

$$\text{Specific volume (cc./g.)} = \frac{\text{Volume of cake (cc.)}}{\text{Weight of cake (g.)}}$$

This value is an indication of cake expansion.

Shortening Mixture I:                                    Parts
  Refined cottonseed oil (of an iodine value
    (I.V.) of 105) _____ 86.7
  Hardened rapeseed oil (of an I.V. of 5 and a
    melting point of 60° C.) _____ 2
  Glycerol monostearate (containing 70% mon-
    oglyceride) _____ 1
  Propylene glycol - monostearate (containing
    82% monoester) _____ 10
  Lecithin _____ 0.3
                                                    -----
    Total _____ 100.0

Shortening Mixture II:
  Refined soybean oil (of an I.V. of 125) _____ 84.7
  Hardened soybean oil (of an I.V. of 3 and a
    melting point of 57° C.) _____ 3
  Glycerol monostearate _____ 0
  Propylene glycol - monostearate (containing
    82% monoester) _____ 12
  Lecithin _____ 0.3
                                                    -----
    Total _____ 100.0

Shortening Mixture III:
  Refined corn oil (of an I.V. of 110) _____ 90.0
  Hydrogenated rapeseed oil (of an I.V. of 5 and
    a melting point of 60° C.) _____ 1.7
  Glycerol monostearate _____ 0.5
  Propylene glycol-distearate _____ 7.5
  Lecithin _____ 0.3
                                                    -----
    Total _____ 100.0

The following is the recipe and procedure used in the tests, the results of which are tabulated in Table II.

Mixture of dough for cakes:                              G.
  Eggs _____ 250
  Sugar _____ 200
  Wheat flour _____ 200
  Shortening mixture _____ 60
  Water _____ 100
  Baking powder _____ 2

The eggs, sugar and shortening were whipped with a

The embodiments of the invention in which an exclusive property or privilege is claimed are defined as follows:

1. A shortening composition which is fluid at low temperature consisting essentially of the following ingredients mixed together in the following named percentages by weight:

|  | Percent |
| --- | --- |
| (a) Vegetable liquid triglycerides | 80–90 |
| (b) Solid triglycerides | 0.5–4 |
| (c) Fatty acid esters selected from the group consisting of glycerol mono- and di-fatty acid esters and mixtures thereof | 0–3 |
| (d) Fatty acid esters selected from the group consisting of propylene glycol mono- and di-fatty acid esters and mixtures thereof | 8–16 |
| (e) Lecithin | 0.1–2 |

2. A shortening composition as described in claim 1 in which said vegetable liquid triglyceride is selected from the group consisting of soybean oil, cottonseed oil, rapeseed oil, corn oil, kapok oil and mixtures thereof.

3. A shortening composition as described in claim 1 in which said solid triglyceride is a hardened oil having a melting point of 40 to 65° C.

4. A shortening composition as described in claim 1 in which said fatty acid esters are esters of a fatty acid of 14 to 22 carbon atoms.

5. A shortening composition as described in claim 1 in which said fatty acid esters are esters of stearic acid.

References Cited

UNITED STATES PATENTS

| 2,050,528 | 8/1936 | Grettie | 99—163 |
| 2,494,771 | 1/1950 | Markley | 99—118 |
| 3,071,472 | 1/1963 | Hager et al. | 99—118 |
| 3,145,110 | 8/1964 | Abbott | 99—118X |
| 3,325,292 | 6/1967 | Endres et al. | 99—118 |

JOSEPH M. GOLIAN, Primary Examiner

U.S. Cl. X.R.

99—118R